United States Patent
Noldus

(10) Patent No.: US 8,861,508 B2
(45) Date of Patent: Oct. 14, 2014

(54) ROUTING A CALL SETUP REQUEST TO A DESTINATION SERVING NODE IN AN IMS NETWORK

(75) Inventor: Rogier Noldus, Goirle (NL)

(73) Assignee: Telefonaktiebolaget L M Ericsson (Publ), Stockholm (SE)

(*) Notice: Subject to any disclaimer, the term of this patent is extended or adjusted under 35 U.S.C. 154(b) by 276 days.

(21) Appl. No.: 13/130,256

(22) PCT Filed: Nov. 24, 2008

(86) PCT No.: PCT/EP2008/009939
§ 371 (c)(1),
(2), (4) Date: May 19, 2011

(87) PCT Pub. No.: WO2010/057513
PCT Pub. Date: May 27, 2010

(65) Prior Publication Data
US 2011/0222532 A1 Sep. 15, 2011

(51) Int. Cl.
*H04L 12/66* (2006.01)
*H04L 29/12* (2006.01)
*H04L 29/06* (2006.01)

(52) U.S. Cl.
CPC ....... *H04L 29/12188* (2013.01); *H04L 65/1016* (2013.01); *H04L 65/1096* (2013.01); *H04L 61/1588* (2013.01)
USPC ............................. 370/352; 370/401; 370/465

(58) Field of Classification Search
None
See application file for complete search history.

(56) References Cited

U.S. PATENT DOCUMENTS

| 6,292,553 | B1* | 9/2001 | Fellingham et al. | 379/221.02 |
| 7,787,878 | B2* | 8/2010 | Li et al. | 455/432.1 |
| 7,916,857 | B2* | 3/2011 | Palmer et al. | 379/229 |
| 8,077,701 | B2* | 12/2011 | Ku et al. | 370/352 |
| 8,085,757 | B2* | 12/2011 | Ku et al. | 370/352 |
| 8,400,947 | B2* | 3/2013 | Heinze et al. | 370/259 |
| 2006/0174009 | A1* | 8/2006 | Martiquet et al. | 709/227 |
| 2007/0104184 | A1* | 5/2007 | Ku et al. | 370/352 |
| 2007/0121890 | A1* | 5/2007 | Li et al. | 379/221.13 |

FOREIGN PATENT DOCUMENTS

| EP | 1761077 A | 3/2007 |
| WO | WO 2006/066145 A | 6/2006 |

* cited by examiner

*Primary Examiner* — Michael J Moore, Jr.

(57) ABSTRACT

A method of routing a call setup request to a destination serving node serving a destination subscriber in an IMS network. The method comprises the steps of a switching node receiving the call setup request having a destination number of the destination subscriber, the switching node querying a number conversion database node for destination routing information using the destination number. The method further comprises the steps of the number conversion database node querying subscriber information for destination serving node information related to the destination number, the number conversion database node receiving destination serving node information from the subscriber information, the number conversion database node replying to the switching node with destination routing information comprising the destination serving node information and the switching node routing the call set up request to the destination serving node using the destination serving node information.

15 Claims, 5 Drawing Sheets

ROUTING A CALL SETUP REQUEST TO A DESTINATION SERVING NODE IN AN IMS NETWORK

TECHNICAL FIELD

The invention relates to a method, a switching node, a number conversion database node and a subscriber database node for routing a call setup request to a destination serving node in an Internet protocol Multimedia Subsystem (IMS) network.

BACKGROUND

Deployment of packet switched telecommunication networks such as Internet protocol Multimedia Subsystem (IMS) networks is on the increase. Many operators are in the process of deploying IMS; initially for voice communication, but soon also for multimedia services. Subscribers of an IMS network may establish and receive voice or video calls. Calls destined for subscribers of an IMS network may originate from a subscriber within the IMS network, or from a telecommunication network outside the IMS network, such as a GSM network, a wireline Public Switched Telephone Network (PSTN), etc.

Call setup requests to a destination subscriber in an IMS network may contain a destination subscriber number, e.g. an E.164 number, to indicate the destination subscriber. The use of E.164 numbers to identify a subscriber is well known since E.164 numbers constitute a convenient method for publicly identifying subscribers in a telecommunication network. Subscribers may migrate from operator to operator, change service provider, and/or change from one network type to another. A subscriber may change for example from a PSTN subscription of a first provider to an IMS subscription of another provider while maintaining the public subscriber number, i.e. E.164 number.

Call setup requests to a destination subscriber in an IMS network must traverse a switching node of the originating network in order to be routed to the destination network. The switching node needs to establish to which destination IMS network the call setup request must be routed. The switching node queries for that purpose a number conversion database node to determine to which network the number of the destination belongs in order to be able to route the call setup request accordingly.

When it has been determined by the number conversion database node that the destination subscriber belongs to an IMS network, the switching node receives network routing information from the number conversion database node relating to the destination IMS network. The call setup request is subsequently routed to the destination IMS network.

Within the destination IMS network the call setup request is first received by an inbound proxy. The inbound proxy queries subscriber information for example in a subscriber database node which then identifies a destination serving node where the destination subscriber is registered. The inbound proxy receives the address of the destination serving node from the subscriber database node and subsequently routes the call setup request to the destination serving node.

The routing of a call setup request towards a destination subscriber of the destination IMS network using E.164 numbers thus causes extensive network traffic load involving the inbound proxy.

SUMMARY

It is therefore an object of the invention to improve network routing of calls using E.164 numbers to subscribers in IMS networks.

The object is achieved according to a first aspect of the invention in a method of routing a call setup request to a destination serving node serving a destination subscriber in a destination IMS network. In the method a switching node receives the call setup request having a destination number of the destination subscriber. The switching node queries a number conversion database node for destination routing information using the destination number. The number conversion database node retrieves destination serving node information from subscriber information relating to the destination IMS network. The number conversion database node replies to the switching node with destination routing information comprising the destination serving node information. The switching node can now route the call set up request to the destination serving node using the destination serving node information.

By using the destination serving node information, the switching node is now capable of routing the call to the destination serving node directly. An inbound proxy is no longer required for querying the subscriber database node. Thus network traffic load is reduced as well as the work load for the inbound proxy querying the subscriber database node.

In an embodiment according to the invention, the subscriber information is comprised in a subscriber database node. The step of the number conversion database node retrieving destination serving node information relating to the destination subscriber from subscriber information comprises the steps of the number conversion database node sending a query for destination serving node information comprising the destination number to the subscriber database node, the subscriber database node obtaining the destination serving node information corresponding to the destination number from the subscriber information comprised in the subscriber database node and the number conversion database node receiving the destination serving node information from the subscriber database node.

The number conversion database node can obtain the destination serving node information from a subscriber database node of the IMS network, also referred to as HSS. This allows a network operator to efficiently use subscriber information by making the subscriber information accessible from the IMS network into another network. Also it is possible for number conversion database nodes operating in other operators' networks, to access the subscriber information of the IMS network to easily access the IMS network under negotiated terms to provide efficient routing according to the invention.

In an embodiment according to the invention, the subscriber information is comprised in the number conversion database node. The step of the number conversion database node retrieving destination serving node information relating to the destination subscriber from subscriber information comprises a step of the number conversion database node obtaining the destination serving node information corresponding to the destination number from the subscriber information comprised in the number conversion database node.

In this embodiment where the number conversion database node and the subscriber database node may be coupled. Retrieval of the destination serving node information is even more efficient. Only a single query in the combined number conversion information and subscriber information needs to be performed to obtain the destination serving node information relating to the destination number. This embodiment would be particularly advantageous for operators who own both the number conversion database node comprised in or connected to the network where the call setup originates, and the subscriber database node.

The object is also achieved according to another aspect of the invention in a method of a switching node routing a call setup request, specially adapted for use in the above described method of routing a call setup request to a destination serving node serving a destination subscriber in an IMS network according to the first aspect of the invention. In the method the switching node receives a call set up request having a destination number of the destination subscriber. The switching node sends a query comprising the destination number a number conversion database node for destination routing information. The switching node receives the destination routing information comprising destination serving node information from the number conversion database node. Subsequently the switching node routes the call set up request to the destination serving node using the destination serving node information.

The switching node is operated such that it can now route the call setup request directly to the destination serving node without the need for an inbound proxy in the IMS network to query a subscriber database node of the IMS network.

In a preferred embodiment according to the invention the serving node address information comprises a destination serving node address.

The subscriber information provides the number conversion database node with a destination serving node address which is then communicated to the switching node enabling it to use the destination serving node address for routing the call to the destination serving node directly.

In another embodiment according to the invention the destination serving node information from the subscriber database node comprises destination serving node capabilities; whereby the method further comprises the step of the method further comprises the additional step of the switching node determining a destination serving node address from the destination serving node capabilities.

The number conversion database node provides the serving node capabilities to the switching node when providing the destination serving node information to the switching node. The switching node can determine a destination serving node for routing the call setup request to by matching the destination serving node capabilities from the number conversion database with the capabilities of available destination serving nodes.

In an alternative embodiment according to the invention the destination serving node information from the subscriber database node comprises destination serving node capabilities, whereby the method further comprises the step of the number conversion database node determining a destination serving node address from the destination serving node capabilities and providing the destination serving node address to the switching node.

The number conversion database node can determine a destination serving node for routing the call setup request to by matching the destination serving node capabilities from the number conversion database with the capabilities of available destination serving nodes.

This allows the subscriber database node to reply to the number conversion database node and the call setup request to be routed to a destination serving node even if no destination serving node address is available, for example due to the destination subscriber not being currently registered with a destination serving node as being active. An originating subscriber may thus be connected to services of the destination subscriber such as voice mail.

The object is also achieved according to another aspect of the invention in a switching node specially adapted for use in the method of routing a call setup request to a destination serving node serving a destination subscriber in an IMS network according to the first aspect of the invention. The switching node comprises the following features: processing means, a first interface means connected to the processing means for receiving a call set up request, a second interface means connected to the processing means for communicating with a number conversion database node and a third interface means connected to the processing means for communicating with a destination serving node. The processing means are arranged for performing the steps of the above described method of a switching node routing a call setup request.

The object is also achieved according to another aspect of the invention in a method of a number conversion database node providing destination information, specially adapted for use in the method of routing a call setup request to a destination serving node serving a destination subscriber in an IMS network according to the first aspect of the invention. The method comprises the steps of the number conversion database node receiving a destination routing information query having a destination number of a destination subscriber in an IMS network, the number conversion database node retrieving destination serving node information related to the destination number from subscriber information and the number conversion database node replying with destination routing information comprising the destination serving node information.

The number conversion database node querying the subscriber information according to the invention instead of an inbound proxy advantageously allows a switching node querying the number conversion database node for network routing information to receive destination serving node information and route a call setup request directly to a destination serving node instead of routing the call setup to an inbound proxy of the destination IMS network.

The object is also achieved according to another aspect of the invention in a number conversion database node specially adapted for use in the method of routing a call setup request to a destination serving node serving a destination subscriber in an IMS network according to the first aspect of the invention. The number conversion database node comprises number conversion information, a first interface means for communicating with a subscriber database node of an IMS network, a second interface means for receiving a destination routing information query from a switching node and replying with destination routing information to the switching node and processing means operatively connected to the number conversion information, the first interface means and the second interface means.

The processing means are arranged for performing the steps of the method of a number conversion database node providing destination routing information according to the above described method of operating a number conversion database node.

In an embodiment of the number conversion database node according to the invention, the number conversion database node further comprises the subscriber information operatively connected to the processing means, allowing the retrieval of destination serving node information to be performed within a single node.

In a further embodiment of the number conversion database node according to the invention, the subscriber information is coupled to the number conversion information, allowing destination serving node information to be obtained in a single query.

The object is also achieved according to another aspect of the invention in a method of a subscriber database node providing destination serving node information specially adapted for use in the method of routing a call setup request to a destination serving node serving a destination subscriber in an IMS network according to the first aspect of the invention. The method comprises the steps of the subscriber database node receiving a query from a number conversion database node for destination serving node information relating to a destination subscriber, obtaining destination serving node information relating to the destination subscriber from subscriber information and the subscriber database node replying to the number conversion database node with destination serving node information.

The object is also achieved according to another aspect of the invention in a subscriber database node specially adapted for use in the method of routing a call setup request to a destination serving node serving a destination subscriber in an IMS network according to the first aspect of the invention. The subscriber database node comprises subscriber information, an interface means for communicating with a number conversion database node and processing means operatively connected to the subscriber information and the interface means.

The processing means are arranged for performing the steps of the above described method of a subscriber database node providing destination serving node information.

By the subscriber database node being communicatively connected to the number conversion database node and by the number conversion database node querying the subscriber database node directly and obtaining destination serving node information, the call setup request can be routed to the destination serving node directly. There is no longer an inbound proxy required, querying the subscriber database node. Thus network traffic load is reduced and a destination serving node is reached more efficiently.

BRIEF DESCRIPTION OF THE DRAWINGS

The invention will be further explained according to the drawings accompanying the description below.

FIG. 1b shows a time-sequence diagram corresponding to the example of the state of the art of FIG. 1a.

FIG. 2b shows a time-sequence diagram according to a method of routing a call setup request to a destination serving node in an IMS network according to the invention, corresponding to FIG. 2a.

DETAILED DESCRIPTION

Figure 1A:
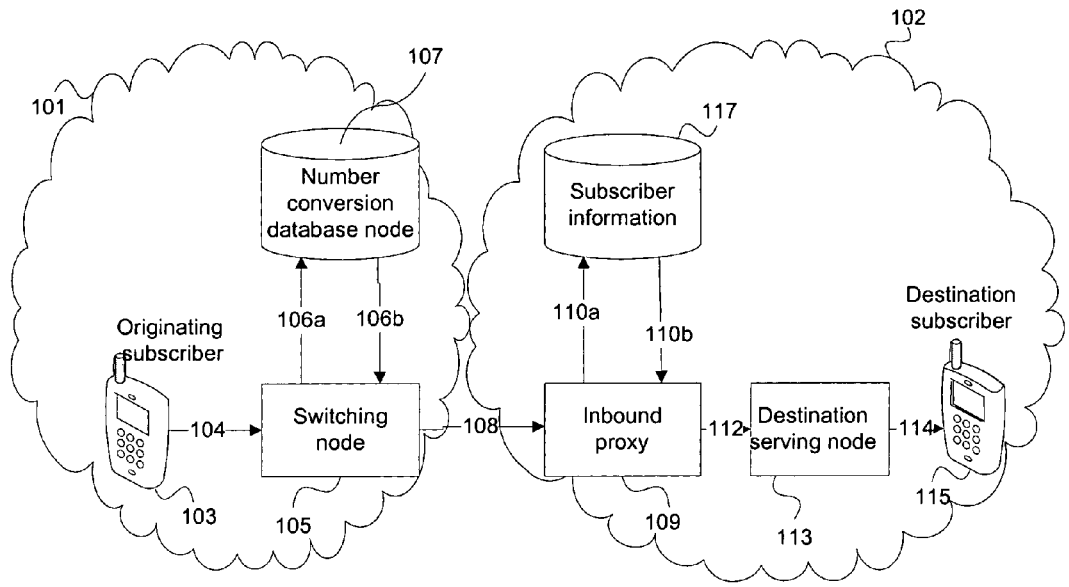
FIG. 1a shows a block diagram of an example of a telecommunication system for routing a call setup request to a destination serving node in an IMS network according to the state of the art.

In the following description and referring to the FIG. 1-7b routing of call setup requests is described from an originating subscriber 103, 203, 303, 503 in an originating network 101, 201, 301, 501 to a destination serving node 113, 213, 313, 513 providing service to a destination subscriber 115, 215, 315, 515 in a destination IMS network 102, 202, 302, 502. Both networks together form a telecommunication system. Generally the originating network 101, 201, 301, 501 is different from the destination IMS network 102, 202, 302, 502, however in special cases both networks may be of the same type, e.g. two IMS networks, as will be demonstrated below according to the examples in the figures.

FIG. 1a shows a block diagram of an example of a telecommunication system for routing a call setup request according to the state of the art. In this example an originating subscriber 103 in an originating network 101 is communicatively connected to a switching node 105 of the originating network 101. The switching node 105 is communicatively connected to a number conversion database node 107 of the originating network comprising number conversion information and to an inbound proxy 109. The inbound proxy 109 is communicatively connected to a subscriber database node of the destination IMS network 102 having subscriber information 117 and to a destination serving node 113 of the destination IMS network 102. The destination serving node 113 is communicatively connected, i.e. provides service, to destination subscriber 115. The destination subscriber 115 is identifiable by means of a destination number, i.e. an E.164 number. In the case of an originating GSM network or other type of mobile network, the E.164 number may be comprised in a Mobile Station Integrated Services Digital Network number (MSISDN). An originating subscriber 103 of the originating network 101 or a destination subscriber 115 of the destination IMS network 102 may be constituted by a Public Service Identity (PSI), a Public Service (PS), a mobile phone, fixed telephone or any other type of user equipment suitable for use in a telecommunication network. When a destination subscriber of the IMS network is constituted by a PSI, the destination serving node 113 for that subscriber, i.e. the destination serving node for the PSI, may be constituted by an Application Server well known to the skilled person. In addition, the switching node in this application may relate to a node for switching call setup signalling messages and not to a node for switching media such as voice or video.

Figure 1B:
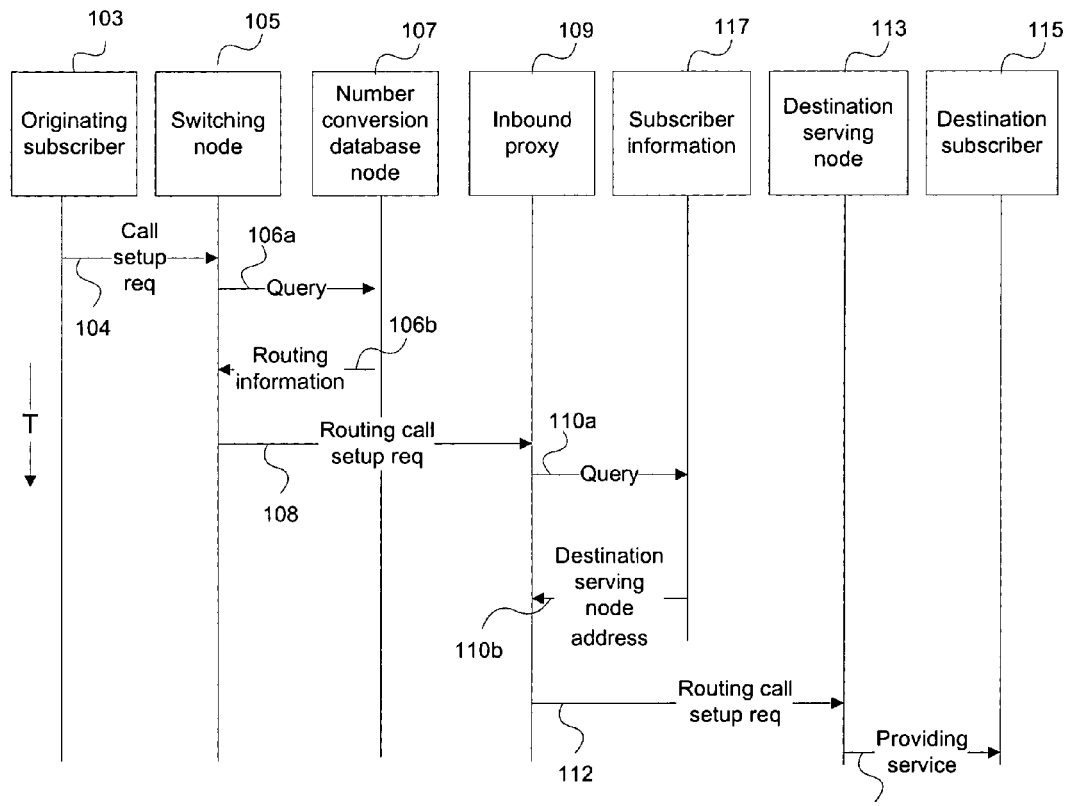

FIG. 1b shows a time-sequence diagram corresponding to the example of FIG. 1a. Setting up a call in the telecommunication system of the above paragraphs and FIG. 1a may be performed according to the steps in FIG. 1b:

A call setup request 104 containing the destination number of a destination subscriber in an IMS network will be routed from the originating subscriber 103 in the originating network 101 to the switching node 105 of the originating network 101. The switching node 105 sends a query 106a comprising the destination number to the number conversion database node 107 to obtain network routing information. The number conversion database node 107 will search its number conversion information using the destination number and return 106b destination routing information indicating the destination IMS network 102. The switching node subsequently routes 108 the call setup request to an inbound proxy 109 of the destination IMS network 102. The inbound proxy 109 will query 110a subscriber information 117 for example comprised in a database node for obtaining destination serving node information relating to the destination subscriber indicated by the destination number. The subscriber database node comprising subscriber information 117 will return the destination serving node address of the destination serving node 113 to the inbound proxy 109. The inbound proxy 109 can now route 112 the call setup request by forwarding it to the destination serving node 113 serving 114 the destination subscriber 115.

In the example of FIG. 1a, the originating network 101 can be a GSM network, the originating subscriber 103 can be a mobile terminal, the call setup request 104 can be a Direct Transfer Application Part (DTAP) setup request having an E.164 number as destination number, the switching node 105 can be a Mobile Switching Centre (MSC) of the GSM network, the number conversion database node 107 can be a Number Portability database (NP), the inbound proxy 109 can be an Interrogating Call Session Control Function (I-SCSF) of the IMS network 102, the subscriber database node can be a Home Subscriber Server (HSS) of the IMS network 102, the destination serving node 113 can be a Serving Call Session Control Function (S-CSCF) of the IMS network 102, the destination 115 can be a fixed telephone or a mobile phone or any other user equipment suitable for users in the IMS network 102. The destination routing information can be a Network Routing Number (NRN).

Subsequently, setting up a call from a GSM network to a destination subscriber in an IMS network according to the above paragraph may be performed according to the steps described below.

An IMS destination subscriber 115 may be registered by means of a Session Initiation Protocol Uniform Resource Identifier (SIP URI) and on an E.164 number, hence the destination subscriber is contactable under an E.164 number by subscribers having a GSM terminal and likewise by subscribers having a PSTN-terminal. A DTAP call setup request 104 (in the case of calling from GSM terminal) containing the destination E.164 number will be routed from the mobile terminal in the GSM network to the MSC. The MSC sends a query comprising the E.164 destination number to the NP database to obtain routing information. The NP database will search its number conversion information using the E.164 destination number and return a Network Routing Number (NRN) indicating the destination IMS network. The MSC subsequently routes the call setup request as an Integrated Services User Part Initial Address Message (ISUP IAM) to an I-CSCF of the destination IMS network, the ISUP IAM traversing a Media gateway control function (MGCF, not shown in FIG. 1a and FIG. 1b). The I-CSCF sends a query having the destination number to the HSS. The HSS will return a S-CSCF address of the S-CSCF serving the destination subscriber in the IMS network. The I-CSCF can now route the call setup request to the S-CSCF serving the IMS destination subscriber using a Session Initiation Protocol (SIP) Invite message.

Likewise, referring to FIGS. 1a and 1b, a call may be set up using a Session Initiation Protocol (SIP Invite) message from an originating subscriber within an IMS network of the originating subscriber to a destination subscriber also in an IMS network. In this case an S-CSCF serving the originating subscriber 103 corresponds to the switching node 105, an E.164 Number Mapping database (ENUM) corresponds to the number conversion database node 105, and HSS corresponds to the subscriber database node. An I-CSCF corresponds to the inbound proxy 109, and an S-CSCF corresponds to the destination serving node 113.

The S-CSCF of the originating subscriber may establish a call towards a destination subscriber that is identified with an E.164 number. The destination subscriber of this call may be, but is not limited to, e.g. a GSM subscriber, a PSTN subscriber, an IMS subscriber. The S-CSCF of the originating subscriber cannot deduce from the E.164 number to which network the destination belongs to; this is due to number portability where subscribers may be ported from one network to another.

Routing the call setup request from the originating subscriber in the IMS network to the destination subscriber identified with an E.164 number involves the interrogation of the ENUM by the S-CSCF of the originating subscriber. If ENUM determines from its number conversion information that the destination subscriber is an IMS subscriber, then ENUM returns a SIP Uniform Resource Identifier (SIP URI) including a domain name that may be used by the S-CSCF to obtain the address of an I-CSCF of the destination IMS network.

Obtaining the address of the S-CSCF may be performed by means of a Dynamic Name Service (DNS) query. The I-CSCF will with the aid of a Diameter-query to the subscriber information in the associated HSS obtain the S-CSCF address of the destination serving node serving the destination subscriber. Thus the call can be routed to that S-CSCF. If, on the other hand, ENUM determines from its internal information that the destination subscriber is not an IMS subscriber, then ENUM does not return a SIP URI. The S-CSCF will in that case route the call setup request to a Breakout Gateway Control Function (BGCF) according to the state of the art.

In both cases where the originating subscriber is a subscriber in an IMS network or a non-IMS network and the destination is a subscriber in an IMS network, and where the destination is identified with an E.164 number, two steps of querying the NP database and a HSS are required by two separate entities to obtain the network address of the destination serving node of the destination subscriber.

Figure 2A:
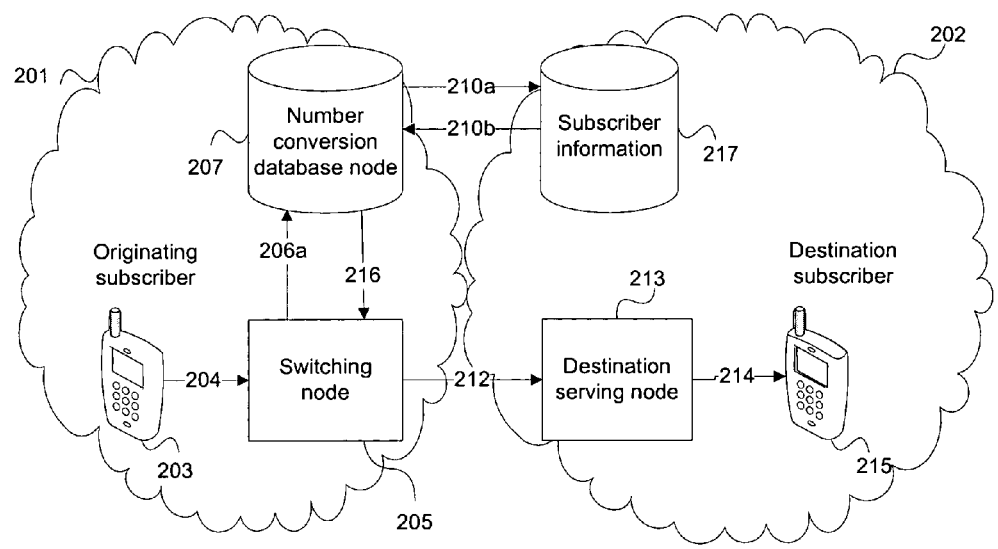
FIG. 2a shows a block diagram of a telecommunication system for routing a call setup request to a destination serving node in an IMS network according to the invention.

FIG. 2a shows a generalised block diagram of a telecommunication system for routing a call setup request to a destination serving node in an IMS network according to the invention. In the block diagram of FIG. 2a, originating subscriber 203 in originating network 201 is communicatively connected to switching node 205 of originating network 201. Switching node 205 is communicatively connected to number conversion database node 207 of originating network 201 and destination serving node 213 of destination IMS network 202. Number conversion database node 207 comprises number conversion information 710 (see FIG. 6b) and communicatively interacts with subscriber information 217 of the destination IMS network 202. The number conversion information 710 provides network routing information associated with a destination number. The subscriber information 217 provides destination serving node information associated with the destination number. The subscriber information 217 providing destination serving node information related to a destination subscriber of the destination network 202 indicated by the destination number may be comprised in a subscriber database node 805 (see FIG. 7b) communicatively connected to the number conversion database node 207. The subscriber information 217 may also be comprised in the number conversion database node 207 where it may be linked or coupled to the number conversion information 710. Destination serving node 213 is communicatively connected to destination subscriber 215 for providing service to the destination subscriber 215. The destination subscriber 215 is registered at the destination serving node 213. The destination serving node 213, the destination subscriber 215 and the subscriber information 217 belong to the same IMS network 202. The switching node 205 and the number conversion database node 207 together may belong to for example a mobile telecommunication network, a packet or circuit switched fixed telecommunication network or an IMS network. In the case of an IMS network 201, it may or may not be integrated with IMS network 202 as will become apparent from the example shown in FIG. 4.

Figure 2B:
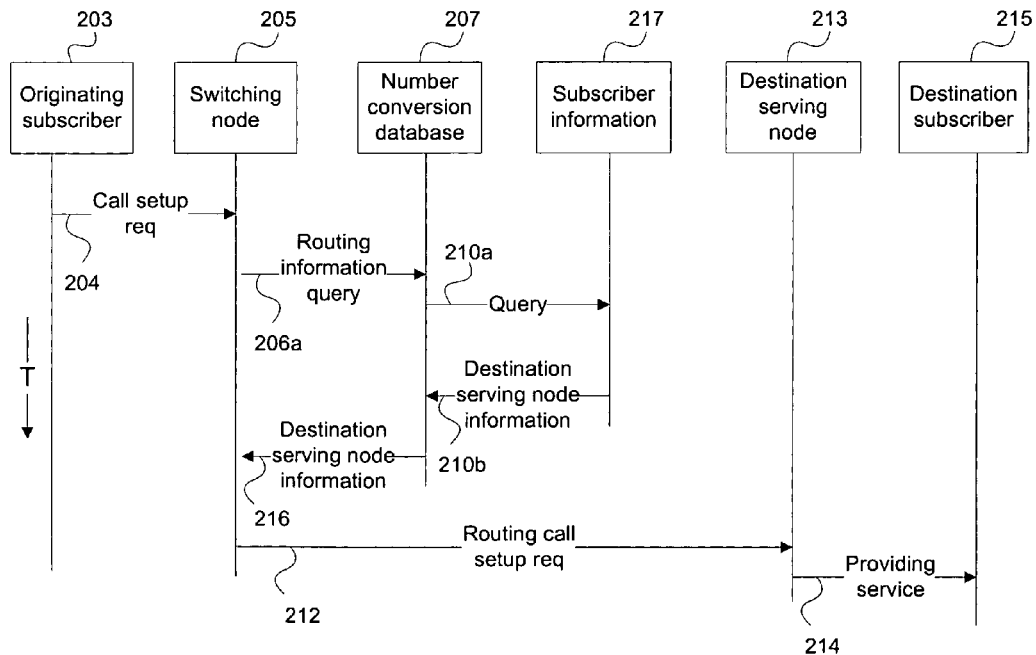

As shown in FIG. 2a and further illustrated by the time-sequence diagram of FIG. 2b, the originating subscriber 203 sets up a call using a call setup request 204. The call setup request 204 has a destination number indicating the destination subscriber 215 in the IMS network 202. The call setup request 204 arrives at the switching node 205, which sends a number conversion query 206a to the number conversion database node 207. When the number conversion database node 207 receives the number conversion query 206a for destination subscriber 215 defined as an IMS subscriber, the number conversion database node 207 checks its number conversion information 710 to see whether it has network routing information associated with that destination number. The destination number may be identified as IMS network destination, i.e. the destination number has the network routing information associated with it of the destination IMS network 202. The number conversion information 710 may for example comprise a marking indicating that the destination subscriber associated with the destination number belongs to an IMS network. In that case the number conversion database node 207 will perform a query 210a in the subscriber information 217 of the IMS network 202 to obtain destination serving node information. To this end the number conversion database node 207 is equipped with an interface means to the subscriber information 217. The subscriber information 217 returns 210b the destination serving node address of the destination subscriber 215 to the number conversion database node 207. The number conversion database node 207 subsequently returns 216 the destination serving node address to the switching node 205. The switching node 205 can now route 212 the call setup request 204 by forwarding it directly to the destination serving node 213 serving the destination subscriber 215. Depending on the originating network 201, the call setup request 204 may traverse a border node (not shown). As a consequence, an inbound proxy 109 as in FIG. 1a, 1b, is no longer required for routing 212 the call setup request 204.

Figure 3:
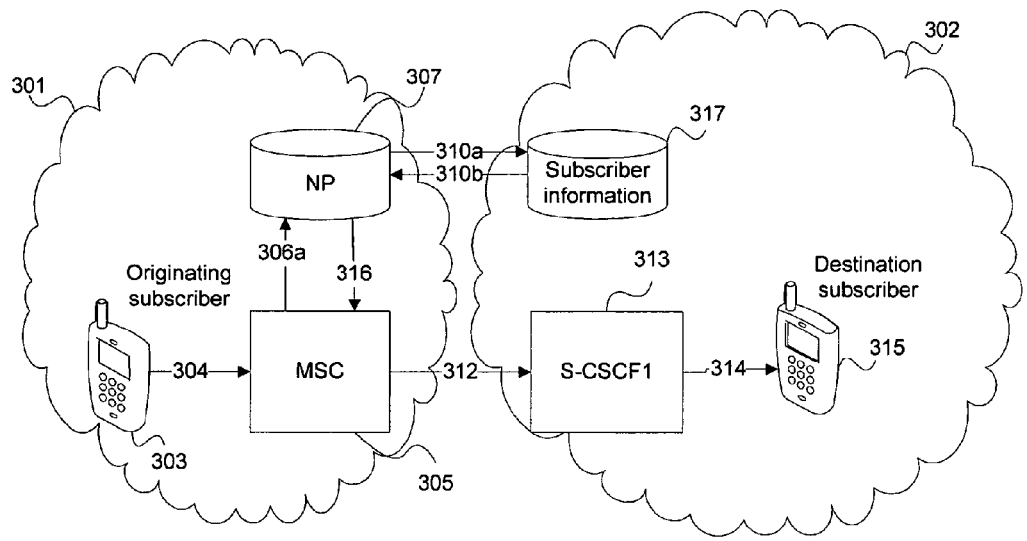
FIG. 3 shows a block diagram of a telecommunication system for routing a call setup request to a destination serving node in an IMS network according to an exemplary embodiment of the invention.

FIG. 3 shows a block diagram of a telecommunication system for routing a call setup request to a destination serving node in an IMS network according to an exemplary embodiment of the invention.

In the block diagram of FIG. 3 GSM network 301 corresponds to the originating network 201, destination IMS network 302 corresponds to the destination IMS network 202, mobile terminal 303 corresponds to the originating subscriber 203, DTAP Setup request 304 corresponds to the call setup request 204 having an E.164 number as destination number, Mobile Switching Centre (MSC) 305 of the GSM network 301 corresponds to the switching node 205, Number Portability database (NP) 307 corresponds to the number conversion database node 207 having number conversion information 710, subscriber information 317 corresponds to the subscriber information 217 and may be comprised in an HSS of the IMS network 302 or in the NP database 307, especially if both networks 301, 302 belong to the same operator. S-CSCF1 313 of the IMS network 302 corresponds to the destination serving node 213, the destination 315 which can be a fixed telephone or mobile terminal or any other user equipment suitable for users in the IMS network 302 corresponds to destination subscriber 215.

Mobile terminal 303 is communicatively connected to MSC 305. MSC 305 is communicatively connected to NP database 307 and S-CSCF 313. NP database 307 communicatively interacts with subscriber information 317. S-CSCF 313 is communicatively connected to destination 315 as destination serving node for providing services to the destination 315.

Mobile terminal 303 sets up a call using a DTAP setup request 304. The DTAP setup request 304 has an E.164 number indicating the destination 315 in the IMS network 302. The DTAP setup request 304 arrives at the MSC 305, which sends an Intelligent Network Capability Set CS1 NP query 306a to the NP database 307. When the NP database 307 receives the CS1 NP query 306a for a destination subscriber 315 defined as an IMS subscriber, the NP database 307 checks its internal database to see whether it has an NRN associated with that E.164 number.

If the destination subscriber's 315 E.164 number has the NRN associated with it of the IMS network 302, the NP database 307 will then perform a Diameter Location information request (LIR) query 310a in the Home Subscriber Server (HSS) comprising the subscriber information 317 of the IMS network 302. To this end the NP database 307 is equipped with a Diameter Interface for interfacing with the subscriber information 317 comprised for example in an HSS 805. Subscriber information 317 returns 310b the S-CSCF address of the S-CSCF 313 servicing the destination subscriber 315 to the NP database 307. The NP database 307 subsequently returns 316 the S-CSCF address to the MSC 305.

The MSC 305 can now route 312 the call setup request 304 directly to the S-CSCF 313 of the destination 315 as a Session Initiation Protocol (SIP) Invite request message 312. The call setup request may now traverse a border node such as an MGCF (not shown) associated with the MSC 305. An inbound proxy 109, I-CSCF in the IMS network 302, is no longer required for routing the call setup.

As described above the subscriber information 317 may alternatively be included in the NP database 307 as follows:

An entry in the NP database 307 i.e. the number conversion information 710 may have an indication that the subscriber's serving network 302 is an IMS network. The NP number conversion information 710 will then also contain an explicit reference in the form of a host name like "hss1.1 ms.kpn.nl" or an implicit reference in the form of the address of a Subscriber locator function (SLF), e.g. a host name like "slf.ims.kpn.nl" to an HSS having the subscriber information 317 of the IMS network 302 to which the destination subscriber 315 belongs and an IMS identification of the destination subscriber 315 of the HSS, which can be an IP Multimedia Public Identity (IMPU), as depicted below:
E.164 number→IMPU+HSS reference
wherein→denotes a logical link.

The HSS has destination serving node information 317 for each IMPU referring to a destination subscriber 315, as depicted below:
IMPU→destination serving node information (e.g. S-CSCF1 313)

The subscriber information 317 pertaining to the destination network 302 may be coupled to the number conversion information 710 of an NP database node 307 using corresponding fields in the number conversion information 710 and subscriber information 317 using the IMPU of destination subscribers 315 as follows:

E.164 number→HSS reference+IMPU→destination serving node information (e.g. S-CSCF1 313).

Consequently for destination subscribers for which the HSS is in the combined NP/HSS database a destination serving node information can be obtained in a single query using the destination number, i.e. the E.164 number, which after sending to the MSC 305 facilitates that the call setup request 304 originating in the network 301 is routed directly to the destination serving node (S-CSCF1 313) of the destination IMS network of the destination subscriber 315:

E.164 number→destination serving node information (e.g. S-CSCF1 313).

Figure 4:
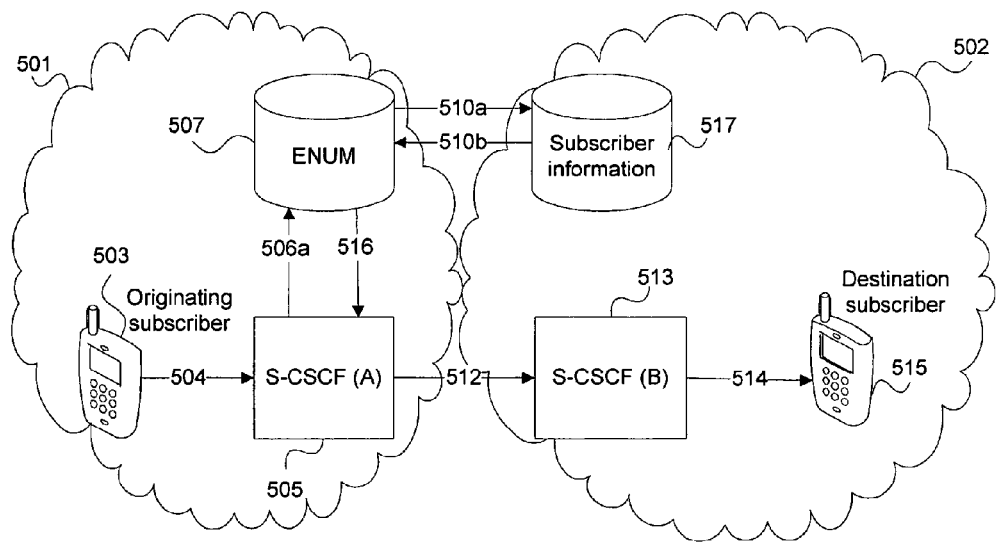
FIG. 4 shows a block diagram of a telecommunication system for routing a call setup request to a destination serving node in an IMS network according to another exemplary embodiment of the invention.

FIG. 4 shows a block diagram of a telecommunication system for routing a call setup request to a destination serving node in an IMS network according to another exemplary embodiment of the invention. In FIG. 4 originating IMS network 501 corresponds to originating network 201, destination IMS network 502 corresponds to destination network 202, originating subscriber 503 corresponds to originating subscriber 203, SIP Invite message 504 corresponds to call setup request 204, S-CSCF 505 serving the originating subscriber 503 corresponds to the switching node 205, E.164 Number Mapping database (ENUM) 507 of the originating IMS network corresponds to the number conversion database node 207. Subscriber information 517 corresponds to the subscriber information 217 and may be comprised in a Home Subscriber Server (HSS) of the destination IMS network 502 or in the ENUM database 507, especially if both networks 501, 502 belong to the same operator. S-CSCF 513 corresponds to the destination serving node 213, destination subscriber 515 corresponds to destination subscriber 215. The originating IMS network 501 and the destination IMS network 502 in this embodiment of the invention may be the same IMS network or two separate IMS networks.

Originating subscriber 503 sets up a call to destination subscriber 515 by sending a SIP invite message 504. The S-CSCF(A) 505 receives the SIP Invite message 504 having an E.164 number of the destination subscriber 515, for example tel:+31-161-249911. S-CSCF(A) 505 queries 506a ENUM 507 for an originating SIP session towards tel:+31-161-249911. S-CSCF(A) 505 and ENUM 507 belong for example to operator "ims-operator.nl". ENUM 507 comprises number conversion information 710 (see FIG. 6b) having a SIP URI associated with the E.164 number, for example: sip:+31161249911@ims-operator.nl.

The SIP URI associated with the E.164 number (sip:+31161249911@ims-operator.nl) may belong to an IMS operator (ims-operator.nl) to which the operator of the origination IMS network 501 has access to subscriber information 517. Hence, instead of returning the SIP URI to S-CSCF(A) 505, ENUM 507 performs an HSS query 510a for this SIP URI in subscriber information 517 which may be comprised in a subscriber database node 805 (see FIG. 7b). Since ENUM 507 has SIP URIs only for subscribers of its own network, it will contact its own subscriber information 517. If there are multiple HSS's having subscriber information 517 in the network 502, then ENUM 507 applies a Subscription Locator Function (SLF) query, prior to performing the HSS query.

For an HSS having subscriber information 517, this is a normal Diameter Location Information Request (LIR) 510a. The HSS returns the S-CSCF address for this destination subscriber, e.g. "s-cscf1.ims-operator.nl".

ENUM 507 returns the SIP URI (sip:+31161249911@ims-operator.nl) to S-CSCF(A) 505 as well as the address of the S-CSCF(B) 513 serving that destination 515 (s-cscf1.ims-operator.nl).

The S-CSCF(A) 505 is adapted to route 512 the SIP Invite for the SIP session directly to the S-CSCF(B) 513.

The above-described method may be also applied when the SIP URI of the destination has non-country specific domain name, e.g. sip:+31161249911@abc-company.com. ENUM 507 will provide SIP URIs normally only for destination subscribers 515 belonging to its own IMS network 501. Hence, when ENUM 507 is queried for number tel:+31-161-249911 and has SIP URI sip:+31161249911@abc-company.com associated with it, ENUM 507 can still assume that this SIP URI belongs to its own network. Hence, ENUM can contact its own network's HSS having subscriber information 517.

In the case the originating subscriber 503 and destination subscriber 515 are serviced by the same S-CSCF 505, there is SIP communication from one S-CSCF process instance, i.e. S-CSCF(A) 505, on behalf of the originating subscriber 503 of the SIP session to another S-CSCF process instance, i.e. S-CSCF(B) 513, on behalf of the destination subscriber 515 of the SIP session.

Since the two S-CSCF process instances 505, 513 reside in the same S-CSCF node, this communication will be more efficient than when it has to be routed via an external I-CSCF.

When the destination subscriber 515 for the SIP session is currently not IMS registered, then the HSS comprising the subscriber information 517 cannot return 510b an S-CSCF (B) address. Instead the HSS comprising the subscriber information 517 will return 510b a parameter containing S-CSCF capabilities pertaining to S-CSCF(B). A receiver of these S-CSCF capabilities, normally an I-CSCF, uses the capabilities to select a best fitting S-CSCF for the destination subscriber 515.

Two solutions are proposed for the situation that ENUM 507 queries subscriber information 517, which returns 510b S-CSCF capabilities. In a preferred embodiment, ENUM 507 returns the S-CSCF capabilities, i.e. capabilities required for selecting S-CSCF(B), to the S-CSCF(A) 505 (i.e. the S-CSCF of the originating subscriber 503 of the SIP session). The S-CSCF(A) 505 derives from the received capabilities an S-CSCF address for the SIP destination subscriber 515 in an additional step. Ideally, the S-CSCF(A) 505 of the originator of the SIP session supports the required capabilities to act also as S-CSCF 513 for the destination SIP subscriber 515. In that case, the originating S-CSCF(A) 505 selects itself as destination S-CSCF(B) 513, resulting in efficient SIP routing.

In addition, the functionality to derive a S-CSCF address from S-CSCF capabilities, is located in an I-CSCF. This functionality comprises a mapping table to map between capabilities and S-CSCF. This functionality may be replicated in S-CSCF(A) 505. Hence, when S-CSCF(A) 505 receives destination S-CSCF capabilities, it may select the destination S-CSCF(B) 513. S-CSCF(A) may also select itself as S-CSCF for destination subscriber 515 on the basis of the S-CSCF capabilities.

In another embodiment, ENUM 507 has functionality to derive an S-CSCF address from the S-CSCF capabilities and then returns this S-CSCF address to the originating S-CSCF (A) 505 as address of S-CSCF(B) 513 of the destination 515. The originating S-CSCF(A) 505 then routes the SIP invite 504 as described above.

If ENUM 507 does not return 516 S-CSCF capabilities to the S-CSCF(A) 505, S-CSCF(A) 505 will now follow the normal route as per state of the art. I.e. it uses the received 516

SIP URI to route the call to I-CSCF as in FIG. 1-*a* and 1-*b* to inbound proxy 109 of destination IMS network 502 etc.

In an embodiment according to the invention ENUM 507 and subscriber information 517 may be combined, linked or functionally coupled, i.e. the number conversion information and subscriber information may be combined or functionally coupled. ENUM 507 contains a table of E.164 numbers (represented as an internet host) and per E.164 number a SIP URI. The SIP URI comprises a combination of the E.164 number and the HSS serving the destination subscriber. An entry for an E.164 number in ENUM 507 may have an HSS reference as an (implicit) indication of the HSS comprising the subscriber information 517 for the subscriber associated with that E.164 number, as depicted below:

E.164 number→SIP URI (Combination of HSS reference+ E.164 number)

The HSS comprising the subscriber information 517 has a table having destination serving node information for each SIP URI (coupled to the E.164 number in ENUM 507) as depicted below:

SIP URI (HSS+E.164)→destination serving node information (S-CSCF(B) 513).

The subscriber information 517 pertaining to the destination network 502 may be coupled to the number conversion information 710 of an ENUM database node 507 using corresponding fields using the SIP URI of destination subscribers 515 as follows:

E.164 number→SIP URI (HSS+E.164)→destination serving node information (e.g. S-CSCF(B) 513).

A query performed in the combined number conversion information and subscriber information for a subscriber having an E.164 number for which the HSS is in the combined ENUM/HSS database thus yields the destination serving node information for a destination subscriber registered in the subscriber information 517 included in ENUM 507 in a single query:

E.164 number→destination serving node information (e.g. S-CSCF(B) 513).

In the following paragraphs describing FIGS. 5*a*, 5*b*, 6*a*, 6*b*, 7*a*, 7*b* the term switching node refers to switching node 205, MSC 305 of FIG. 3 and S-CSCF(A) 505 of FIG. 4. Furthermore the term call setup request 204, 304, 504 refers to the establishment of a voice or multimedia communication session towards a destination serving node 213, 313, 513 serving a subscriber 215, 315, 515 of the IMS network 202, 302, 502.

Figure 5A:
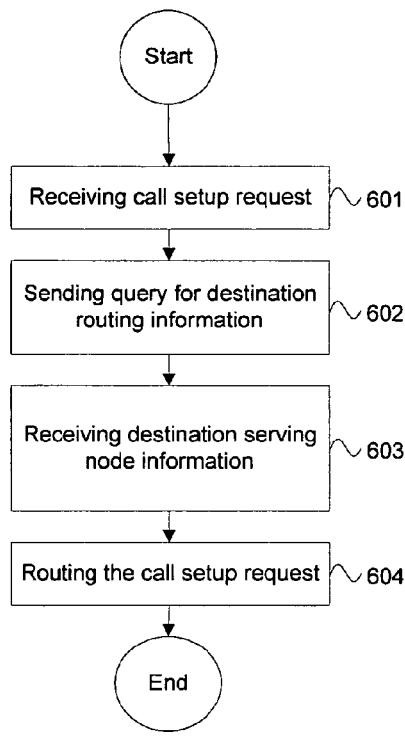
FIG. 5a shows the steps of a method of a switching node routing a call setup request according to the invention.

FIG. 5*a* shows the steps of a method of a switching node 205, 305, 505 routing 212, 313, 512 a call setup request 204, 304, 505 according to the invention. The various elements involved in the method are referred to in FIG. 2*a*, and to corresponding elements in FIGS. 3 and 4.

In step 601 switching node 205, 305, 505 receives a call setup request 204, 304, 504 having a destination number such as an E.164 number or MSISDN of a destination in an IMS network 202.

In step 602 switching node 205, 305, 505 sends a query 206*a*, 306*a*, 506*a* for routing information to a number conversion database node 207, 307, 507 using the destination number.

In step 603 switching node 205, 305, 505 receives 216, 316, 516 routing destination information from the number conversion database node 207, 307, 507, the routing information comprising destination serving node information. The destination serving node information may comprise a destination serving node address or destination serving node capabilities. In the case of destination serving node capabilities, the switching node 205, 305, 505 performs an intermediate step not shown in FIG. 5*a* of determining a destination serving node address from the destination serving node capabilities.

In step 604 switching node 205, 305, 505 routes 212, 312, 512 the call setup request to the destination serving node 213, 313, 513 using the destination serving node information, i.e. the destination serving node address.

In the case the destination serving node 213, 313, 513 is the same as the switching node 205, 305, 505 a process instance operating within the switching node 205, 305, 505 on behalf of the destination subscriber 215, 315, 515 will receive the call setup request (not shown in FIG. 5*a*).

Figure 5B:
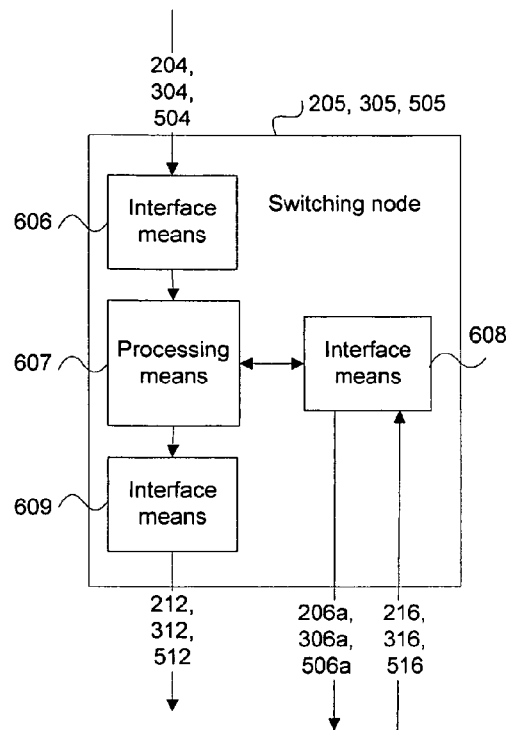
FIG. 5b shows a block diagram of a switching node according to the invention.

FIG. 5*b* shows block diagram of a switching node 205, 305, 505. The switching node 205, 305, 505 may be an MSC 305, an S-CSCF 505 or any telecommunication switching node adapted for performing the steps 601 to 604 as shown in FIG. 5*a* or as described in the above paragraph.

The switching node 205, 305, 505 comprises a first interface means 606 for receiving a call setup request 204, 304, 504 as in FIGS. 2*a* and 2*b*, 3 and 4, a second interface means 608 for communicating 206*a*, 306*a*, 506*a*, 216, 316, 516 with a number conversion database node 207, 307, 507 and a third interface means 609 for communicating 212, 312, 512 with a destination serving node 213, 313, 513 in an IMS network 202, 302, 502. Interface means 606, 608 and 609 can be interfaces according to telecommunication standards well known to the skilled person. Interface means 606 may for example be an interface for receiving DTAP, ISUP or SIP setup requests. Interface means 609 may be a SIP interface. Interface means 608 may be an INAP interface or an ENUM interface.

The switching node 205, 305, 505 further comprises processing means 607 connected to the interface means 606, 608 and 609 which processor means may comprise a processor, memory and/or dedicated processing hardware, adapted for performing the steps 601 to 604 of the method as shown in FIG. 5*a* or as described above in relation with FIG. 5*a*.

Figure 6A:
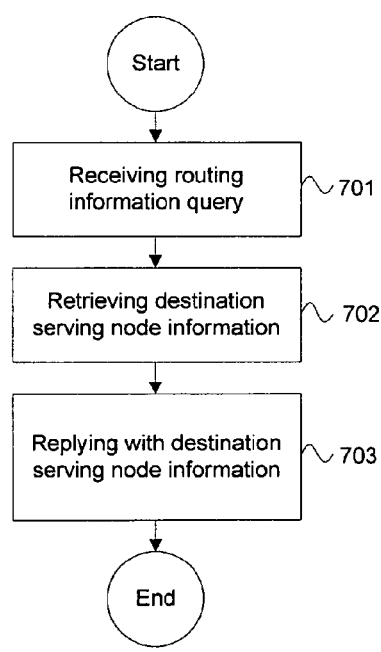
FIG. 6a shows the steps of a method of a number conversion database node providing destination routing information according to the invention.

FIG. 6*a* shows the steps of a method of a number conversion database node 207, 307, 507 providing destination routing information according to FIGS. 2*a*, 2*b*, 3 and 4.

In step 701 the number conversion database node 207, 307, 507 receives a query 206*a* from a switching node 205 for destination routing information. The query comprises a destination number such as an E.164 number or an MSISDN of a destination subscriber 215, 315, 515 in an IMS network 202, 302, 502.

In step 702 the number conversion database node 207, 307, 507 determines destination serving node information related to the destination number from subscriber information 217, 317, 517. The subscriber information 217, 317, 517 can be stored in a subscriber database node 805 such as an HSS. The subscriber information 217, 317, 517 may also be combined with number conversion information 710 in the number conversion database node 207, 307, 507. Number conversion information 710 allows a destination address such as a SIP URI to be retrieved on the basis of destination number such as an E.164 number or an MSISDN. Subsequently subscriber information allows destination serving node information to be retrieved on the basis of the destination address. The destination serving node information comprises a destination serving node address. However if the destination subscriber 215, 315, 515 is not registered, i.e. there is no destination serving node address available, the subscriber information 217, 317, 517 may provide destination serving node capabilities from which a destination serving node address may be derived.

In step 703 the number conversion database node 207, 307, 507 replies 216, 316, 516 to the switching node 205, 305, 505 with destination routing information comprising destination serving node information.

Figure 6B:
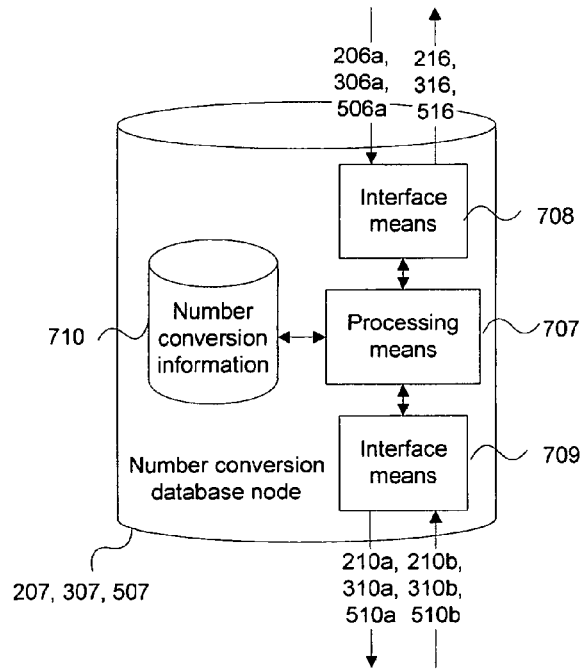
FIG. 6b shows a block diagram of a number conversion database node according to the invention.

FIG. 6*b* shows block diagram of a number conversion database node 207, 307, 507. The number conversion database node 207 may be an NP database 307, in a mobile switched network or PSTN. The number conversion database node 207 may also be an ENUM database 507 in an IMS network or any telecommunication number conversion database node adapted for performing the steps 701 to 703 as shown in FIG. 6*a* or as described in the above paragraph.

The number conversion database node 207, 307, 507 comprises number conversion information 710, an interface means 708 for receiving a destination routing information query 206*a*, 306*a*, 506*a* from a switching node 205, 305, 505 as in FIGS. 2*a*, 2*b*, 3, and 4 and for replying 216, 316, 516 with destination routing information comprising destination serving node information, an interface means 709 for communicating 210*a*, 310*a*, 510*a*, and 210*b*, 310*b*, 510*b* with a subscriber database node having subscriber information 217, 317, 517 for sending a query for destination serving node information and receiving the destination serving node information. Interface means 708 and 709 can be interfaces according to telecommunication standards well known to the skilled person. Interface means 708 may be for example an INAP interface or an ENUM interface. Interface means 709 may for example be a Diameter (LIR/LIA) interface.

The number conversion information 710 may be stored in at least one database table at least comprising a field for a destination subscriber number such as an E.164 number and a field indicating the destination subscriber address associated with the destination subscriber number. The number conversion information 710 may have a marking that a subscriber is a subscriber receiving service from an IMS network.

The number conversion database node 207, 307, 507 further comprises a processing means 707 connected to the number conversion information 710, the interface means 708 and 709. The processing means 707 may comprise a processor, a memory and/or dedicated processing hardware, adapted for performing the steps 701 to 703 of the method as shown in FIG. 6*a* or as described above in relation with FIG. 6*a*.

In an embodiment of the invention, the subscriber information 217, 317, 517 may be comprised in the number conversion database node 207, 307, 507. In that case the number conversion database node 207, 307, 507 according to FIG. 6*b* may be adapted for that purpose. The processing means 707 may be arranged to query or search and retrieve the subscriber information 217, 317, 517 the destination serving node information corresponding to the destination subscriber 215, 315, 515 and may be arranged to also perform the steps of FIG. 7*a*. This way a combined number conversion and subscriber database node is created.

The subscriber information 217, 317, 517 may also be stored in a set of tables separate from the number conversion information 710, such that HSS queries may be performed on it separately, however the number conversion information 710 and the subscriber information 217, 317, 517 may also be combined or linked as described above in relation to FIGS. 3 and 4 in a single set of tables such that a single query in the number conversion information 710 also yields the destination serving node address or destination serving node capabilities.

Figure 7A:
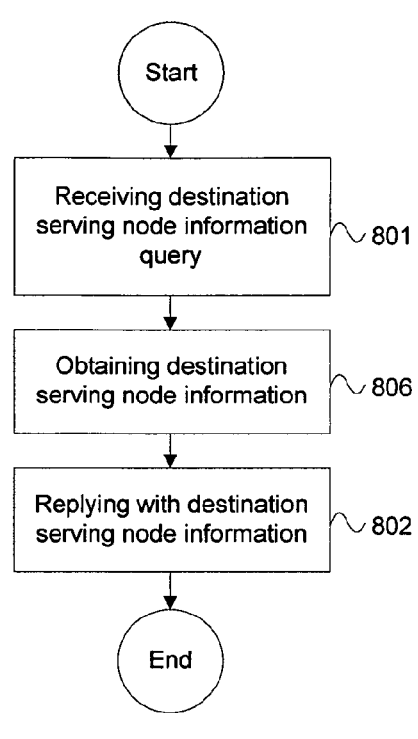
FIG. 7a shows the steps of a method of a subscriber database node providing destination serving node information according to the invention.

FIG. 7*a* shows steps of a method of a subscriber database providing destination serving node information according to an embodiment of the invention. The various elements involved in the method are referred to in FIG. 2*a*, and also to corresponding elements in FIGS. 3 and 4. In this embodiment the subscriber information 217, 317, 517 is present in a subscriber database node 805.

In step 801 the subscriber database node 805 receives 210*a*, 310*a*, 510*a* a destination serving node information query from a number conversion database node 207, 307, 507. The query may comprise a destination address of a destination subscriber 215, 315, 515 such as a SIP URI.

In step 802 the subscriber database node 805 returns 210*b*, 310*b*, 510*b* the destination serving node information to the number conversion database node 207, 307, 507. The destination serving node information may comprise a destination serving node address, however if the destination subscriber 215, 315, 515 is currently not registered, the subscriber database node 805 may return destination serving node capabilities from a destination subscriber profile in the subscriber database node 805. Destination serving node capabilities, well known to the skilled person in the art, are parameters describing destination serving node characteristics or requirements corresponding to the destination subscriber's subscription.

By providing destination serving node capabilities, i.e. S-CSCF capabilities, to the number conversion database node 207, 307, 507, an NP database 307 or an ENUM database according to embodiments of the invention, the subscriber database node 805 comprising subscriber information 217, 317, 517 can distribute subscribers over multiple destination serving nodes, i.e. S-CSCF's. The destination serving node capabilities assigned to a destination subscriber 215, 315, 515 (that is, indicated in his/her user profile in the subscriber database node 805) may be adapted to that person's set of IMS services. For example a prepaid subscriber 215, 315, 515 shall be registered in an S-CSCS 213, 313, 513 that supports the required capability for applying prepaid.

Examples of destination serving node capabilities include:
Indication that the destination serving node supports 'originating unregistered users';
Indication that the destination serving node supports the 'IMS communication services' identifier as input for analyzing the Initial Filter Criteria (IFC) (IFC are used for IMS service invocation);
Indication that the destination serving node supports certain authorization mechanism.

S-CSCF capabilities are for example transferred from an HSS comprising subscriber information 217, 317, 517 to an Enhanced NP database 307 or an enhanced ENUM 507, in a designated Diameter message. Specifically, the following Diameter messages may contain S-CSCF capabilities:
Location information answer (LIA);
User authorization answer (UAA).

The capabilities are placed in a designated parameter inside the Diameter message.

Figure 7B:
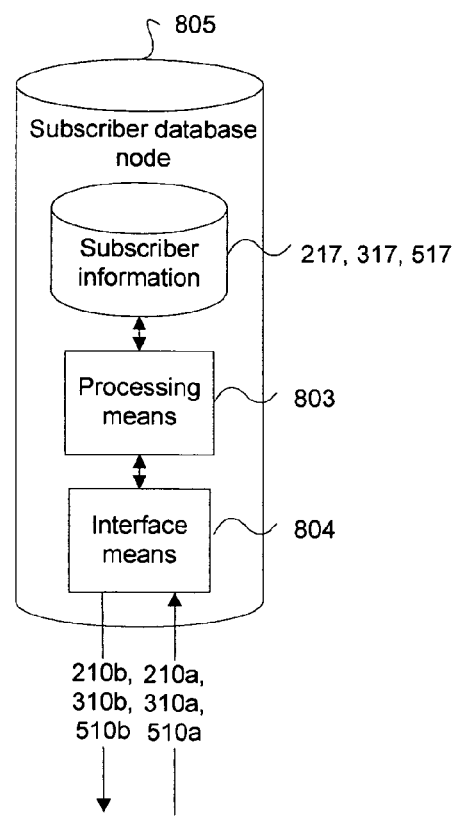
FIG. 7b shows a block diagram of a subscriber database node according to the invention.

FIG. 7*b* shows a block diagram of a subscriber database node 805. The subscriber database node 805 may be an HSS in an IMS network, adapted for performing the steps 801 to 802 as shown in FIG. 7*a* or as described in the above paragraph.

The subscriber database node 805 comprises subscriber information 217, 317, 517 and an interface means 804 for receiving a destination serving node information query 210*a*, 310*a*, 510*a* as in FIGS. 2*a* and 2*b* from the number conversion database node 207, 307, 507 and for replying 210*b*, 310*b*, 510*b* with destination serving node information to the number conversion database node 207, 307, 507. Interface means 804 can be an interface according to telecommunication standards well known to the skilled person. An example of such an interface is a Diameter interface well known to the skilled person.

The subscriber information 217, 317, 517 may be stored in at least one database table at least comprising a field for a destination subscriber address (URI) and a field indicating the destination serving node address (S-CSCF) or destination serving node capabilities associated with the destination subscriber.

The subscriber database node 805 further comprises a processing means 803 connected to the subscriber information 217, 317, 517 and the interface means 804 which processing means 803 may comprise a processor, memory and/or dedicated processing hardware, adapted for performing the steps 801 to 802 of the method as shown in FIG. 7a or as described in relation with FIG. 7a.

It must be understood that the embodiments described in this application are provided as examples only and that variations are possible without departing from the scope of the invention as defined by the following claims.

The invention claimed is:

1. A method of routing a call setup request from an originating network to a destination serving node in a destination Internet protocol Multimedia Subsystem ("IMS") network, the method comprising:
   a) a switching node in the originating network receiving the call setup request, in the form of a Session Initiation Protocol (SIP) Invite, having a destination number indicating a destination subscriber receiving service from the destination serving node;
   b) the switching node sending a query comprising the destination number to a number conversion database node within the originating network for destination routing information;
   c) the number conversion database node retrieving destination serving node information relating to the destination subscriber from subscriber information relating to the destination IMS network in response to the query for destination routing information from the switching node, the destination serving node information comprising:
      a destination serving node address; and
      a Session Initiation Protocol Uniform Resource Identifier (SIP URI) associated with the destination subscriber;
   d) the number conversion database node replying to the switching node with destination routing information comprising the destination serving node address and the SIP URI; and
   e) the switching node routing the SIP Invite directly to the destination serving node using the destination serving node address and the SIP URI.

2. The method according to claim 1, wherein the subscriber information is comprised in a subscriber database node and wherein the step of the number conversion database node retrieving destination serving node information relating to the destination subscriber from subscriber information further comprises the steps of:
   a) the number conversion database node sending a query for destination serving node information comprising the destination number to the subscriber database node;
   b) the subscriber database node obtaining the destination serving node address corresponding to the destination number from the subscriber information comprised in the subscriber database node; and
   c) the number conversion database node receiving the destination serving node address from the subscriber database node.

3. The method according to claim 1, wherein the subscriber information is comprised in the number conversion database node and wherein the step of the number conversion database node retrieving destination serving node information relating to the destination subscriber from subscriber information comprises a step of the number conversion database node obtaining the destination serving node address corresponding to the destination number from the subscriber information comprised in the number conversion database node.

4. A method of a switching node routing a call setup request in a method of routing a call setup request from an originating network to a destination serving node in a destination Internet protocol Multimedia Subsystem ("IMS") network, comprising:
   a) the switching node receiving a call setup request, in the form of a Session Initiation Protocol (SIP) Invite, having a destination number indicating a destination subscriber receiving service from the destination serving node;
   b) the switching node sending a query comprising the destination number to a number conversion database node in the originating network for destination routing information;
   c) the switching node receiving the destination routing information comprising:
      a destination serving node address serving the destination subscriber from the number conversion database node; and
      a Session Initiation Protocol Uniform Resource Identifier (SIP URI) associated with the destination subscriber; and
   d) the switching node routing the SIP Invite directly to the destination serving node using the destination serving node address and the SIP URI.

5. The method according to claim 4, further comprising:
   a) the switching node obtaining destination serving node capabilities from the number conversion database node; and
   b) the switching node determining a destination serving node address from the destination serving node capabilities.

6. A switching node, used in a method of routing a call setup request from an originating network to a destination serving node in a destination Internet protocol Multimedia Subsystem ("IMS") network, the switching node comprising:
   a) processing means;
   b) a first interface means operatively connected to the processing means for receiving a call setup request, in the form of a Session Initiation Protocol (SIP) Invite, having a destination number indicating a destination subscriber receiving service from the destination serving node;
   c) a second interface means operatively connected to the processing means for sending a query comprising the destination number to a number conversion database node in the originating network and receiving destination routing information from the number conversion database node comprising:
      a destination serving node address serving the destination subscriber; and
      a Session Initiation Protocol Uniform Resource Identifier (SIP URI) associated with the destination subscriber; and
   d) a third interface means operatively connected to the processing means for routing the SIP Invite directly to the destination serving node in the destination IMS network using the destination serving node address and the SIP URI.

7. A method of a number conversion database node providing destination routing information, used in a method of routing a call setup request, in the form of a Session Initiation Protocol (SIP) Invite, from an originating network to a destination serving node in a destination Internet protocol Multimedia Subsystem ("IMS") network, the method comprising:
a) the number conversion database node in the originating network receiving a query from a switching node in the originating network, the query having a destination number of a destination subscriber being served by the destination serving node in the destination IMS network;
b) the number conversion database node retrieving destination serving node information from subscriber information relating to the destination IMS network, the destination serving node information comprising:
a destination serving node address serving the destination subscriber; and
a Session Initiation Protocol Uniform Resource Identifier (SIP URI) associated with the destination subscriber;
c) the number conversion database node replying to the switching node with destination routing information comprising the destination serving node address and the SIP URI.

8. The method according to claim 7, wherein the subscriber information is comprised in a subscriber database node and wherein the step of the number conversion database node retrieving the destination serving node information relating to the destination subscriber from subscriber information comprises the steps of:
a) the number conversion database node sending a query for destination serving node information comprising the destination number to the subscriber database node;
b) the subscriber database node obtaining the destination serving node address corresponding to the destination number from the subscriber information comprised the subscriber database node; and
c) the number conversion database node receiving the destination serving node address from the subscriber database node.

9. The method according to claim 7, wherein the subscriber information is comprised in the number conversion database node and wherein the step of the number conversion database node retrieving destination serving node information relating to the destination subscriber from subscriber information comprises a step of the number conversion database node obtaining the destination serving node address corresponding to the destination number from the subscriber information comprised in the number conversion database node.

10. The method according to claim 7, further comprising
a) the number conversion database node obtaining destination serving node capabilities from the subscriber information; and
b) the number conversion database node determining a destination serving node address from the destination serving node capabilities.

11. A number conversion database node used in a method of routing a call setup request, in the form of a Session Initiation Protocol (SIP) Invite, from an originating network to a destination serving node in a destination Internet protocol Multimedia Subsystem ("IMS") network, the number conversion database node comprising;

a) memory including number conversion information;
b) a first interface means for receiving subscriber information of a destination IMS network;
c) a second interface means for receiving a query from a switching node in the originating network, the query having a destination number of a destination subscriber being served by the destination serving node in the destination IMS network, retrieving destination serving node information from subscriber information relating to the destination IMS network, the destination serving node information comprising a destination serving node address serving the destination subscriber and a Session Initiation Protocol Uniform Resource Identifier (SIP URI) associated with the destination subscriber, and sending a reply with destination routing information to the switching node; and
d) a processing means operatively connected to the memory, the first interface means and the second interface means; wherein the processing means perform the steps of a method of a number conversion database node providing destination routing information.

12. The number conversion database node according to claim 11, further comprising a database for the subscriber information operatively connected to the processing means.

13. The number conversion database node according to claim 11 wherein the destination serving node is a Serving Call Session Control Function (S-CSCF).

14. A method of a subscriber database node providing destination serving node information used in a method of routing a call setup request, in the form of a Session Initiation Protocol (SIP) Invite, from an originating network to a destination serving node in a destination Internet protocol Multimedia Subsystem ("IMS") network, the method characterized in comprising the steps of:
a) the subscriber database node receiving a query from a number conversion database node in the originating network for destination serving node information relating to a destination subscriber;
b) obtaining a destination serving node address serving the destination subscriber from subscriber information and a Session Initiation Protocol Uniform Resource Identifier (SIP URI) associated with the destination subscriber;
c) the subscriber database node replying to the number conversion database node with the destination serving node address and the SIP URI.

15. A subscriber database node used in a method of routing a call setup request, in the form of a Session Initiation Protocol (SIP) Invite, from an originating network to a destination serving node in a destination Internet protocol Multimedia Subsystem ("IMS") network, the subscriber database node comprising:
a) memory including subscriber information;
b) an interface means for communicating with a number conversion database node in the originating network and receiving a query from the number conversion database node for destination serving node information relating to a destination subscriber;
c) processing means operatively connected to the memory and the interface means, wherein the processing means perform the steps of obtaining a destination serving node address serving the destination subscriber from subscriber information and a Session Initiation Protocol Uniform Resource Identifier (SIP URI) associated with the destination subscriber, and replying to the number conversion database node with the destination serving node address and the SIP URI.

* * * * *

UNITED STATES PATENT AND TRADEMARK OFFICE
CERTIFICATE OF CORRECTION

PATENT NO. : 8,861,508 B2  Page 1 of 1
APPLICATION NO. : 13/130256
DATED : October 14, 2014
INVENTOR(S) : Noldus It is certified that error appears in the above-identified patent and that said Letters Patent is hereby corrected as shown below:

In the specification

In Column 10, Line 50, delete ""hss1.1 ms.kpn.nl"" and insert -- "hss1.ims.kpn.nl" --, therefor.

In the claims

In Column 19, Line 55, in Claim 10, delete "comprising" and insert -- comprising: --, therefor.

In Column 19, Line 67, in Claim 11, delete "comprising;" and insert -- comprising: --, therefor.

Signed and Sealed this
Twenty-fourth Day of November, 2015

Michelle K. Lee
*Director of the United States Patent and Trademark Office*